United States Patent [19]

Manlove et al.

[11] Patent Number: 4,959,859
[45] Date of Patent: Sep. 25, 1990

[54] FM CHANNEL SEPARATION ADJUSTMENT

[75] Inventors: Gregory J. Manlove; Jeffrey J. Marrah, both of Kokomo; Richard A. Kennedy, Russiaville, all of Ind.

[73] Assignee: Delco Electronics Corporation, Kokomo, Ind.

[21] Appl. No.: 284,882

[22] Filed: Dec. 15, 1988

[51] Int. Cl.$^5$ .............................................. H04H 5/00
[52] U.S. Cl. ...................................................... 381/10
[58] Field of Search .................... 381/3, 4, 2, 10, 11, 381/13

[56] References Cited

U.S. PATENT DOCUMENTS

| 4,063,042 | 12/1977 | Mallon | 381/4 |
| 4,748,669 | 5/1988 | Klayman | 381/1 |
| 4,841,572 | 6/1989 | Klayman | 381/17 |

OTHER PUBLICATIONS

Stark, "A Continuously Variable Stereo Dimension Control".

*Primary Examiner*—Forester W. Isen
*Attorney, Agent, or Firm*—Albert F. Duke

[57] ABSTRACT

An attenuator in the composite L-R signal path used for dynamic signal control for blend purposes is limited in range by a static separation adjust signal which attenuates the maximum L-R signal to a value selected for the best right and left channel separation upon matrixing of the L+R and L-R signals. The gain of the L-R signal path is set greater than the L+R path so that a wide adjustment range is available to the separation adjustment circuit.

4 Claims, 1 Drawing Sheet

FM CHANNEL SEPARATION ADJUSTMENT

FIELD OF THE INVENTION

This invention relates to an FM stereo channel separation circuit.

BACKGROUND OF THE INVENTION

Composite FM stereo signals as detected by an FM receiver comprise a base band (0-15 kHz) containing the sum of the left and right channel signals (L+R), a 19 kHz pilot signal and a subchannel centered at 38 kHz containing the difference of the left and right channel signals (L−R). To decode the composite signal the decoder of an FM stereo receiver must lock onto the pilot signal for synchronization of the transmitter and receiver and then multiply the FM composite signal by a 38 kHz signal that is in phase with the original pilot. This multiplication process generates another composite signal having the L−R signal at the base band and having the L+R signal at the subchannel frequencies. The high frequencies of each composite signal are readily removed by filtering and the pilot is removed by a cancelling operation so that essentially the base band remains in each signal. To separate right from left the signals are added to yield a left channel signal and the signals are differenced to yield a right channel signal. If the composite signals are mismatched the left channel will have some right channel information in the output and the right channel will have some left channel information. Channel separation is a measure of how well the receiver has maintained each signal free of the other signal.

Heretofore it has been the practice to make separation adjustments by adjusting the gain of the L−R portion of the signal before it has been decoded. This requires a gain that is frequency dependent, resulting in circuit complexity and a loss of separation at high frequencies.

SUMMARY OF THE INVENTION

It is therefore an object of the invention to provide a more accurate separation adjustment. It is another object to provide simpler implementation of the channel separation function.

The invention is carried out in an FM stereo circuit having a composite signal with base band left plus right channel content and another composite signal with base band left minus right channel content, and means for deriving from the composite signals separate right and left channel signals with each channel signal being substantially free of components of the other channel, means for adjusting the static separation of the channel signals comprising means for increasing the gain of one of the composite signals with respect to the other composite signal, and means for statically attenuating the said one composite signal to equalize the signal strengths of the two composite signals, whereby the derived left and right channels will be substantially free of signals from the other channel.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figure 1:
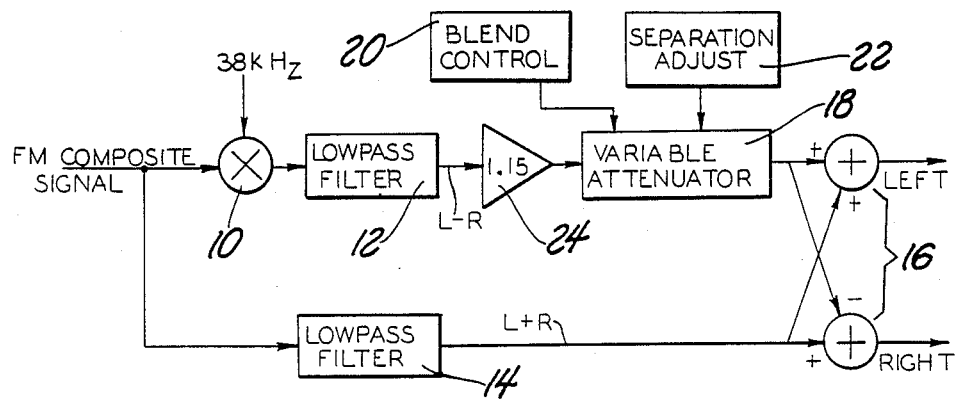
FIG. 1 is a functional block diagram of a portion of an FM decoder including separation adjustment circuit according to the invention.

As shown in FIG. 1 an FM composite signal containing left plus right signals in its base band and left minus right signals in a sub band is multiplied in a multiplier circuit 10 by a 38 kHz sine wave to generate another composite signal having left minus right signals in its base band. Each composite signal is filtered by a low pass filter 12 or 14 to remove or suppress the high frequency base bands L+R and L−R respectively. These signals are combined in a matrix 16 by adding the signals and separately subtracting the signals to yield left channel and right channel signals.

Under good signal conditions it is desired to have the low pass filtered signals at equal strength so that the left and right channel signals will each be free of signals from the other channel to result in optimum stereo sound quality. On the other hand, when received signals are poor and have a low signal to noise ratio, better sound quality is obtained by L+R signals in both left and right output channels to yield mono operation. It is conventional practice to blend the signals by gradually reducing the L−R signal as signal conditions deteriorate by placing a variable attenuator 18 in the L−R path. The variable attenuator 18 is controlled by a blend control circuit 20 which is responsive to noise in the composite signal and is effective to vary the L−R signal from full strength to zero so that any signal combination from full stereo to full mono can be realized. The blend control is thus a dynamic adjustment since it varies with time in dependence on signal conditions.

Separation adjustment is a functional correction made during alignment procedures at the time of manufacture and thus is a static adjustment. The purpose of the adjustment is to equalize the L+R and L−R signals under good signal conditions to enable maximum channel separation. A separation adjust circuit 22 provides a voltage signal to the variable attenuator 18 to cause a reduction of the L−R signal to equalize it with the L+R signal. To assure that the L−R signal is initially larger than the L+R signal a 15% gain is added to the L−R signal path as indicated at 24. This gain is easily implemented in the lowpass filter 12 with no additional hardware. Thus in addition to the standard blend circuitry the only element needed to achieve the separation adjustment is the separation adjust control 22 which is a variable voltage source such as a resistive voltage divider plus input signal conditioning. This arrangement provides simplicity in implementing separation adjustment as well as accuracy since it occurs at the place of channel separation rather than many stages prior to the matrix 16.

Figure 2:
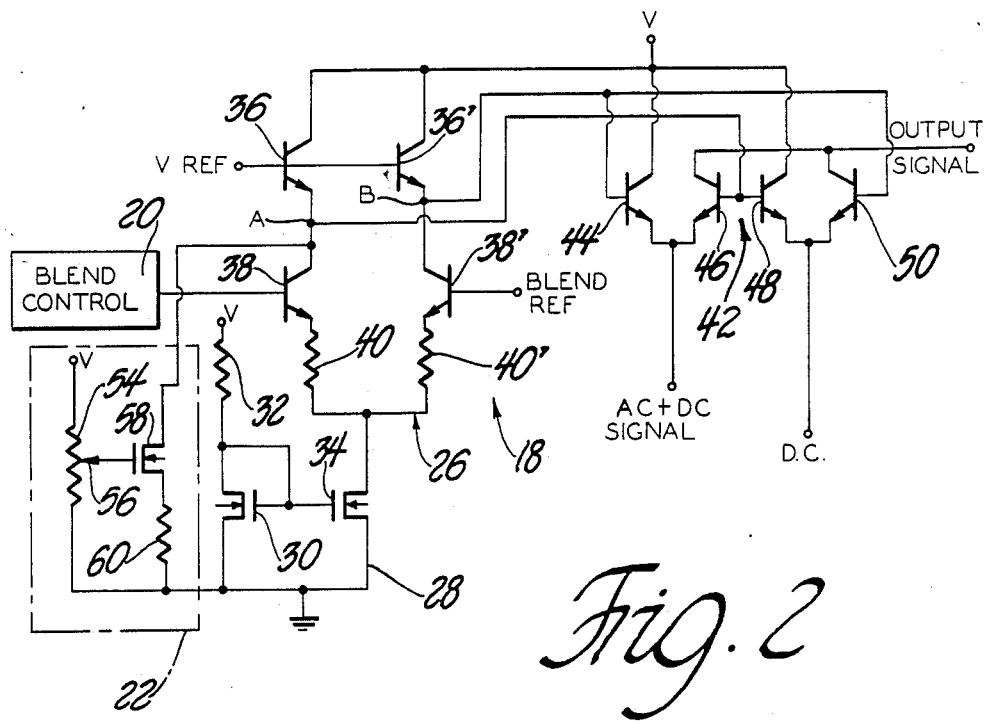
FIG. 2 is a schematic diagram of blend control and separation adjustment circuitry according to the invention.

FIG. 2 shows the schematic of the variable attenuator 18 as adapted to the separation adjustment function. A differential amplifier 26 comprises a current source 28 having a first transistor 30 having its drain connected through a resistor 32 to a voltage supply V and having its source connected to ground and a second transistor 34 having its source connected to ground and its drain serving as the current source terminal. The gates of both transistors are connected to the drain of transistor 30. The remainder of the differential amplifier consists of two parallel paths each having a first transistor 36, 36' having its collector connected to the voltage supply V and its base connected to a common constant voltage reference, a second transistor 38, 38' having its collector connected at a node A, B to the emitter of the first transistor and its emitter connected through a resistor 40, 40' to the current source 28. The voltages at the nodes A and B comprise the differential amplifier output. The input is the bases of the transistors 38, 38'. The latter transistor 38' has its base connected to a constant reference. The base of transistor 38 is connected to the blend control circuit 20 so that the differential amplifier output depends on the blend control signal.

A multiplier 42 is used as a current steering circuit to form the output current of the attenuator 18. Two transistors 44 and 46 have their emitters connected to the L−R signal which comprises an AC component and a DC component. The collector of transistor 44 is connected to the voltage supply V and the base is connected to the node B of the differential amplifier 26. The collector of transistor 46 is connected to the current output of the attenuator and the base is connected to node A. Two other transistors 48 and 50 have their emitters connected to a constant DC current. The collector of transistor 48 is connected to the voltage supply and the base is connected to the node A of the differential amplifier 26. The collector of transistor 50 is connected to the current output of the attenuator and the base is connected to node B. The current steering circuit 42 transmits proportionate amounts of the L−R signal and the constant DC current to the output in accordance with the relative node voltages. When the blend control voltage on the base of transistor 38 is low relative to the reference voltage on the base of transistor 38' the node A voltage is high and the output has a high content of the L−R signal. When the blend control voltage increases the voltage at node A decreases and the signal content of the output also decreases. This attenuation circuit 18 is able to vary the L−R signal content of the output from 100% to zero as a function of the blend control voltage. It is well known to use this attenuation circuit 18 for that purpose. The adjunctive use of the same circuit for channel separation is new, however.

The separation adjust circuit 22 comprises a variable resistor 54 connected between voltage supply V and ground and including a variable tap 56 supplying the adjust voltage to the gate of an N-channel transistor 58. The transistor drain is coupled to node A of the differential amplifier 26 and the source is connected via a resistor 60 to ground. When the separation adjust voltage on the transistor 58 is less than an N-channel threshold there is no effect on the attenuation circuit and it can operate over its full dynamic range. On the other hand, when the voltage on the gate of transistor 58 is greater than an N-channel threshold the transistor 58 conducts and lowers the voltage at node A so that the dynamic range of the attenuator is limited and 100% of the L−R signal is no longer obtainable on the attenuator output, the maximum signal value depending on the separation adjust voltage. Thus the attenuation circuit coupled with the separation adjust circuit allows the output strength to be dynamically adjusted by the blend control signal and statically limited by the factory set separation adjustment.

The embodiments of the invention in which an exclusive property or privilege is claimed are defined as follows:

1. In an FM stereo circuit having a composite signal with base band left plus right channel content and another composite signal with base band left minus right channel content, and means for deriving from the composite signals separate right and left channel signals with each channel signal being substantially free of components of the other channel, means for adjusting the static separation of the channel signals comprising, means for increasing the gain of one of the composite signals with respect to the other composite signal, and blend control means including variable attenuator means for dynamically attenuating said one of said composite signals as a function of a signal strength, means for statically attenuating the said one composite signal by limiting the range of the blend control means to equalize the signal strengths of the two composite signals, whereby the derived left and right channels will be substantially free of signals from the other channel.

2. In an FM stereo circuit having a composite L+R signal with left plus right channel content and a composite L−R signal with left minus right channel content, matrix means for deriving from the composite signals separate right and left channel signals with each channel signal being substantially free of components of the other channel, and blending means for dynamically reducing the AC content of the L−R signal, means for adjusting the static separation of the channel signals comprising means for increasing the gain of the composite L−R signal with respect to the L+R composite signal, and means for attenuating the L−R composite signal to equalize the signal strengths of the two composite signals including the blending means and an adjustment circuit for limiting the range of the blending means to a limit at which the composite signals are substantially equal, whereby the derived left and right channels will be substantially free of signals from the other channel.

3. The invention as defined in claim 2 wherein the blending means includes a differential amplifier having a constant reference voltage input and a blend control input, the attenuation of the L−R signal being a function of the differential amplifier output, and the adjustment circuit comprises voltage controlled means coupled to the differential amplifier for biasing the output thereof to a desired minimum attenuation value, whereby a maximum value of the L−R signal can be established.

4. The invention as defined in claim 3 wherein the adjustment circuit comprises a transistor and a resistor serially connected between ground and one output of the differential amplifier to lower the maximum voltage at that output so that the dynamic range of the differential amplifier can be restricted, the transistor having a control terminal controlled by voltage, and means for adjustably supplying a control voltage to the terminal.

* * * * *